US011566646B2

(12) United States Patent
Osborne et al.

(10) Patent No.: US 11,566,646 B2
(45) Date of Patent: Jan. 31, 2023

(54) STRUCTURAL INSERT REINFORCEMENT SYSTEMS AND METHODS

(71) Applicant: The Boeing Company, Chicago, IL (US)

(72) Inventors: John C. Osborne, Bothell, WA (US); Terrence C. Seet, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 390 days.

(21) Appl. No.: 16/785,500

(22) Filed: Feb. 7, 2020

(65) Prior Publication Data

US 2021/0246923 A1 Aug. 12, 2021

(51) Int. Cl.
| | |
|---|---|
| *F16B 21/18* | (2006.01) |
| *F16B 5/02* | (2006.01) |
| *F16B 43/00* | (2006.01) |
| *F16B 29/00* | (2006.01) |

(52) U.S. Cl.
CPC ............ *F16B 5/0258* (2013.01); *F16B 29/00* (2013.01); *F16B 43/00* (2013.01)

(58) Field of Classification Search
CPC .... F16B 15/126; F16B 5/0664; F16B 5/0258; F16B 29/00; F16B 43/00
USPC ........................................................ 411/108
See application file for complete search history.

(56) References Cited

U.S. PATENT DOCUMENTS

| | | | | |
|---|---|---|---|---|
| 1,339,609 | A * | 5/1920 | Stinson ................... | F02M 35/04 261/18.2 |
| 3,313,079 | A * | 4/1967 | Phelan ...................... | F16B 5/01 52/793.1 |
| 3,339,609 | A * | 9/1967 | Cushman ................... | B64C 1/12 264/261 |
| 10,920,812 | B2 * | 2/2021 | Avetisian .............. | F16B 5/0642 |
| 2003/0002919 | A1 * | 1/2003 | Morita ................... | B60S 1/0444 403/408.1 |
| 2010/0086377 | A1 * | 4/2010 | de Mola .................... | F16F 7/00 411/176 |
| 2013/0185895 | A1 * | 7/2013 | Daniel .................. | F16B 5/0258 16/2.1 |
| 2014/0212241 | A1 * | 7/2014 | Burd ......................... | F16B 5/01 411/366.1 |
| 2015/0337886 | A1 * | 11/2015 | Coronado ............. | F16B 37/122 29/525.02 |
| 2015/0369209 | A1 * | 12/2015 | Datta ...................... | F03D 13/40 211/85.8 |
| 2015/0369269 | A1 * | 12/2015 | Holt ........................ | F16B 21/02 411/108 |

(Continued)

*Primary Examiner* — Gary W Estremsky
(74) *Attorney, Agent, or Firm* — Haynes and Boone, LLP

(57) ABSTRACT

An insert may include an outer sleeve that includes a first tubular portion and a first disk portion perpendicular to the first tubular portion at an end of the first tubular portion. An inner sleeve includes a second tubular portion and a second disk portion perpendicular to the second tubular portion at an end of the second tubular portion. The second tubular portion of the inner sleeve may be configured to be inserted in the first tubular portion of the outer sleeve. The first disk portion of the outer sleeve may include a first surface and a second surface, wherein the second surface includes a recess configured to accommodate the second disk portion of the inner sleeve when the second tubular portion is inserted in the first tubular portion.

20 Claims, 8 Drawing Sheets

(56) References Cited

U.S. PATENT DOCUMENTS

| | | | | |
|---|---|---|---|---|
| 2019/0154073 A1* | 5/2019 | Figge | .................... | F16B 5/0258 |
| 2020/0063782 A1* | 2/2020 | Bansal | .................. | F16B 11/006 |
| 2020/0256375 A1* | 8/2020 | Osborne | ............... | F16B 39/284 |

* cited by examiner

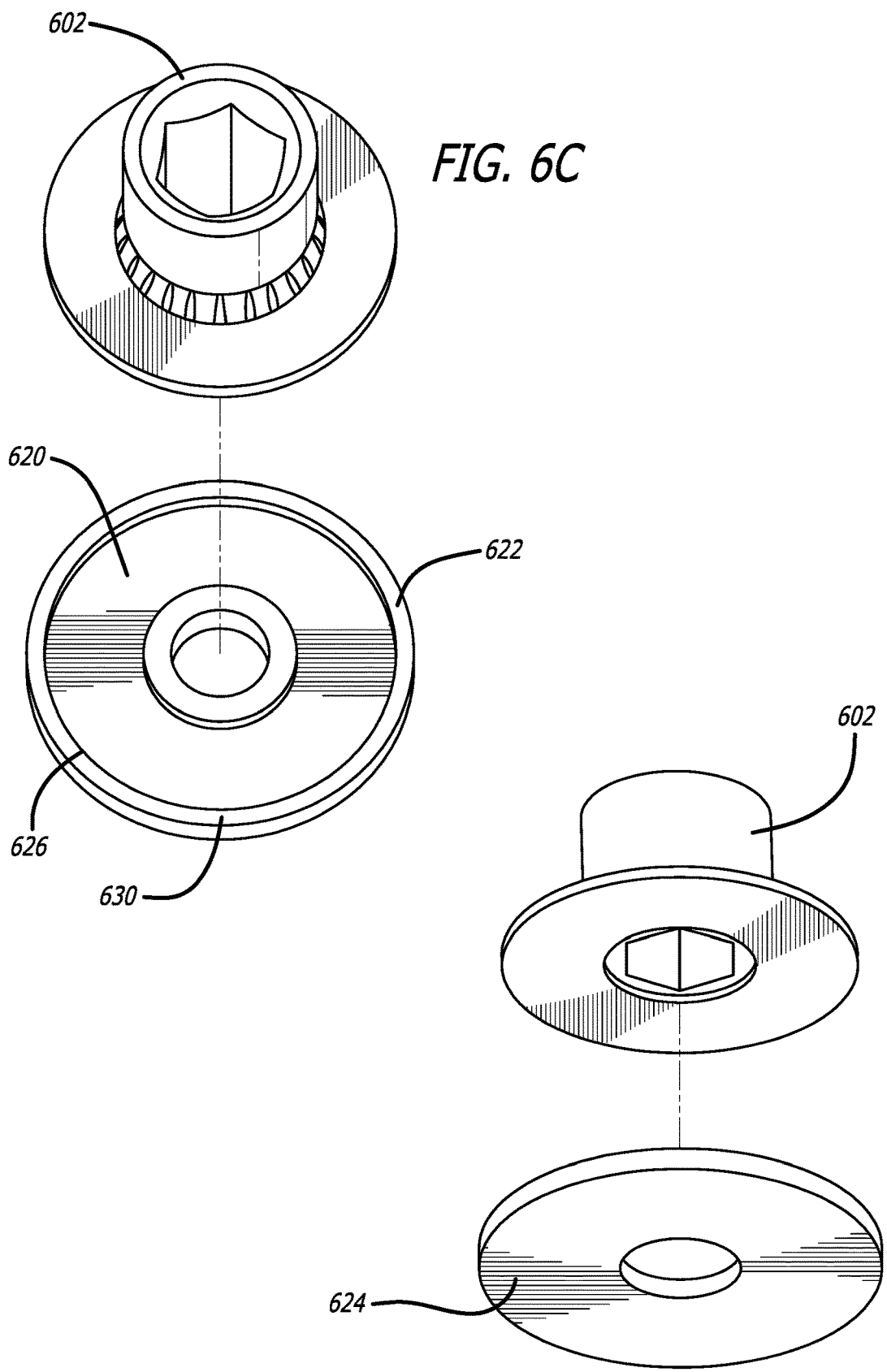

STRUCTURAL INSERT REINFORCEMENT SYSTEMS AND METHODS

TECHNICAL FIELD

The present application generally relates to corrosion free inserts. More particularly, it relates to structural insert reinforcement systems and methods.

BACKGROUND

Panels used on aircrafts may be coupled to one another using fastening devices. For example, interior floor panels of a passenger cabin in an aircraft may be made of carbon fiber honeycomb panels mounted to a seat track below with fastening assemblies and devices. Manufacturers are often faced with challenges due to corrosion concerns of such fastening assemblies and the surrounding areas of the panels because of the environment in which the aircrafts are exposed on a regular basis and because of the type of material with which they are made. Therefore, corrosion resistive techniques for mounting panels in an aircraft are desired.

SUMMARY

According to an example, an insert is described, including: an outer sleeve including a first tubular portion and a first disk portion perpendicular to the first tubular portion at an end of the first tubular portion; an inner sleeve including a second tubular portion and a second disk portion perpendicular to the second tubular portion at an end of the second tubular portion; wherein the second tubular portion of the inner sleeve is configured to be inserted in the first tubular portion of the outer sleeve; and wherein the first disk portion of the outer sleeve includes a first surface and a second surface, wherein the second surface includes a recess configured to accommodate the second disk portion of the inner sleeve when the second tubular portion is inserted in the first tubular portion.

According to another example, an insert is described, including: a sleeve including a substantially tubular portion and a disk portion perpendicular to the tubular portion at an end of the tubular portion; and a plate including a larger diameter than the disk portion of the sleeve, and including a first surface and a second surface, wherein the first surface includes a recessed portion configured to accommodate the disk portion of the sleeve.

According to another example, a method for manufacturing an insert is described. The method includes: fabricating an outer sleeve with a non-corrosive material, the outer sleeve including a first tubular portion and a first disk portion perpendicular to the first tubular portion at an end of the first tubular portion; fabricating an inner sleeve with a metallic material, the inner sleeve including a second tubular portion and a second disk portion perpendicular to the second tubular portion at an end of the second tubular portion, wherein the second tubular portion of the inner sleeve is configured to be inserted in the first tubular portion of the outer sleeve; and wherein the first disk portion of the outer sleeve includes a first surface and a second surface, wherein the second surface includes a recess configured to accommodate the second disk portion of the inner sleeve when the second tubular portion is inserted in the first tubular portion.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 6C-6D are perspective exploded views of the insert of FIGS. 6A-6B, according to yet another example of the present disclosure.

Figure 1:
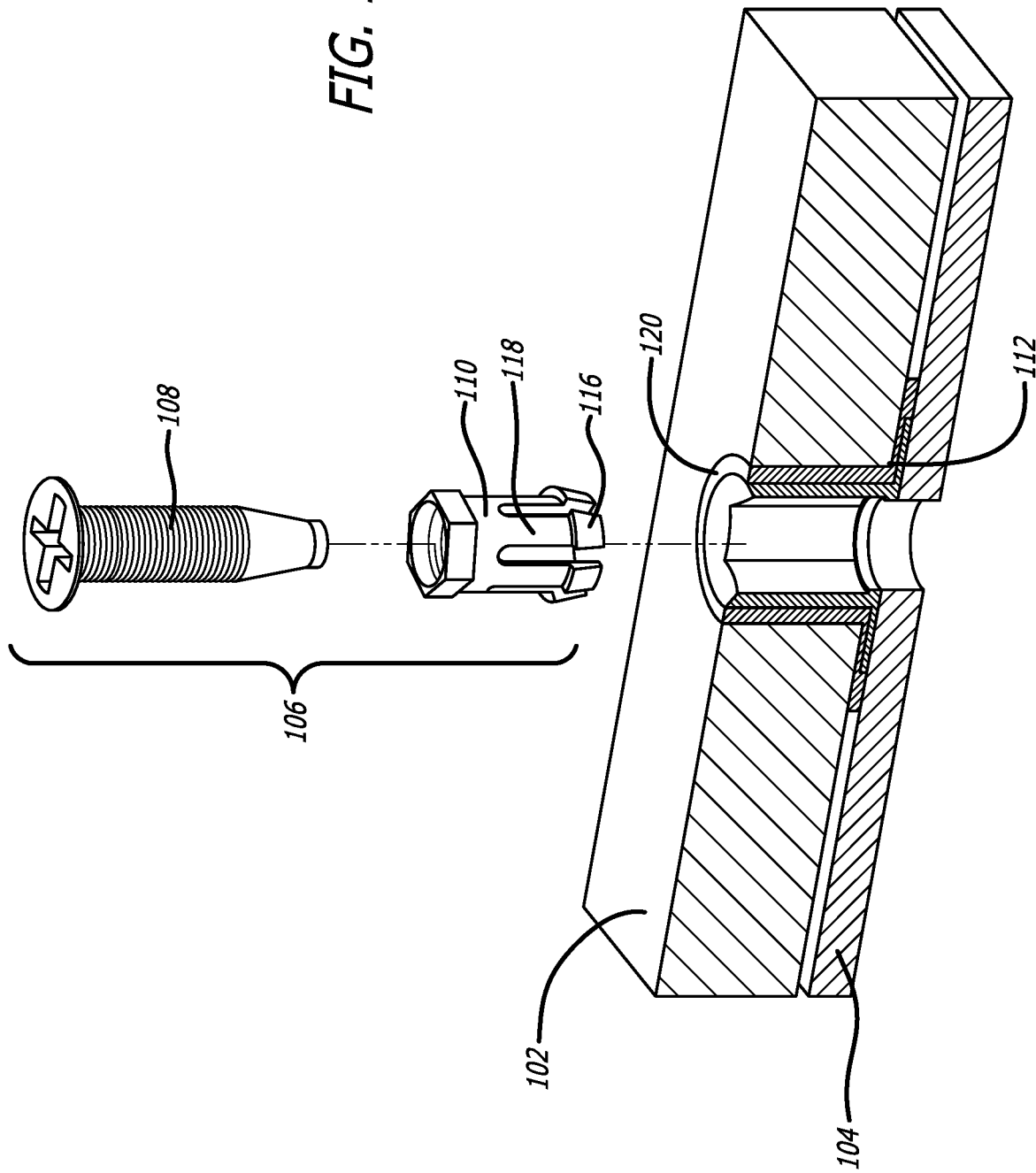
FIG. 1 is a cross sectional perspective view of an insert disposed in an opening of a panel and an exploded perspective view of a corresponding fastener and e-nut configured to be disposed through an opening of the insert, according to an example of the present disclosure.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

Figure 2:
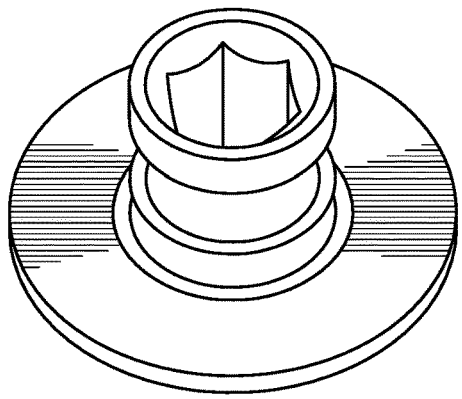
FIG. 2 is a perspective view of a conventional insert configured to be disposed in an opening of a panel.
Figure 3A:
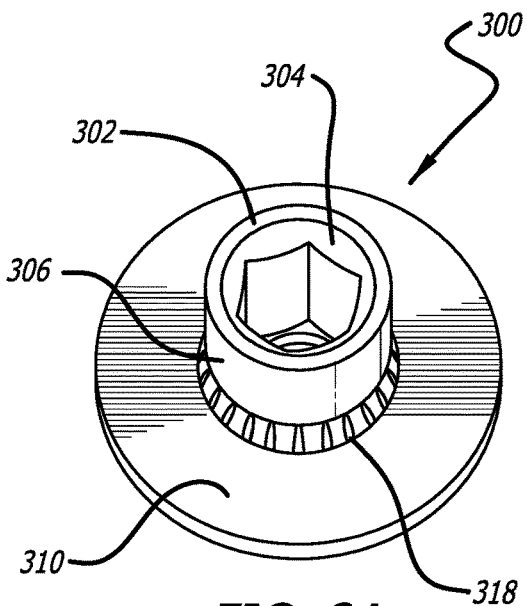
FIGS. 3A-3B are perspective views of the insert, according to an example of the present disclosure.
Figure 3B:
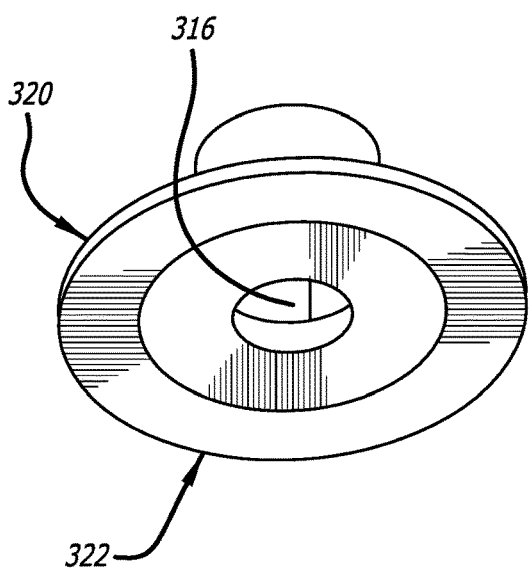
Figure 3C:
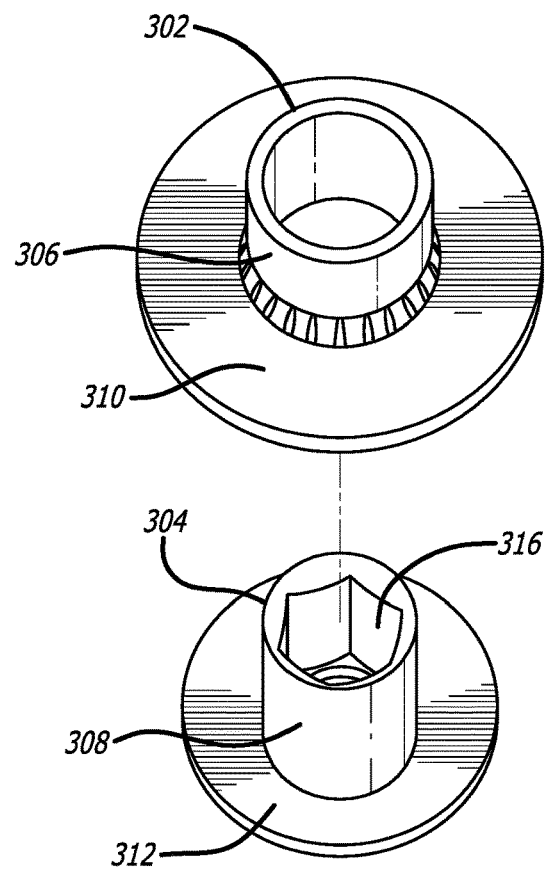
FIGS. 3C-3D are perspective exploded views of the insert of FIGS. 3A-3B, according to an example of the present disclosure.
Figure 3D:
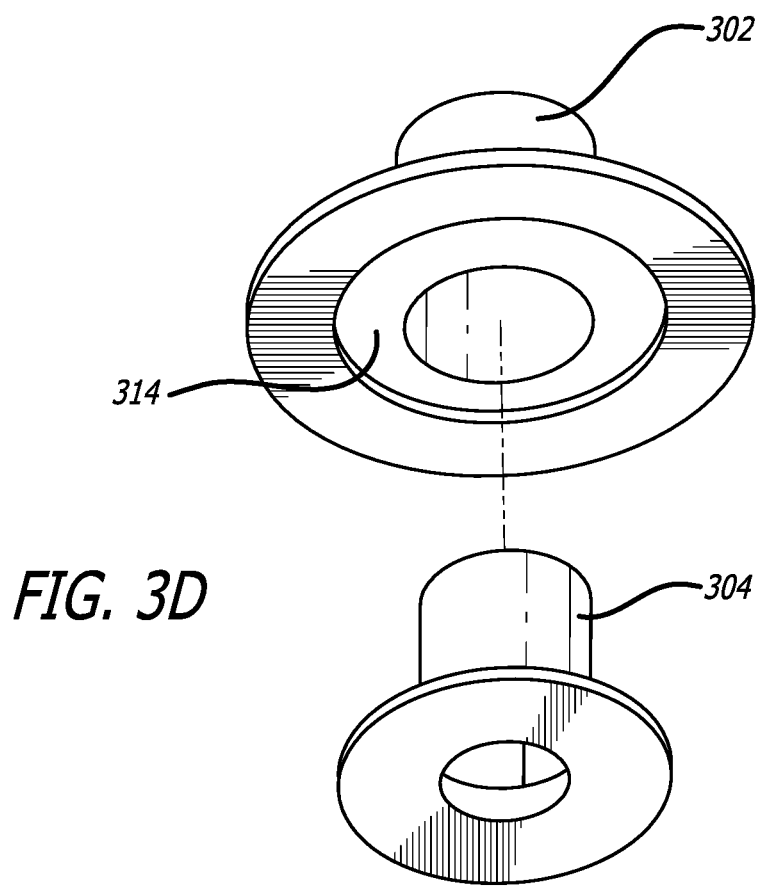
Figure 3E:
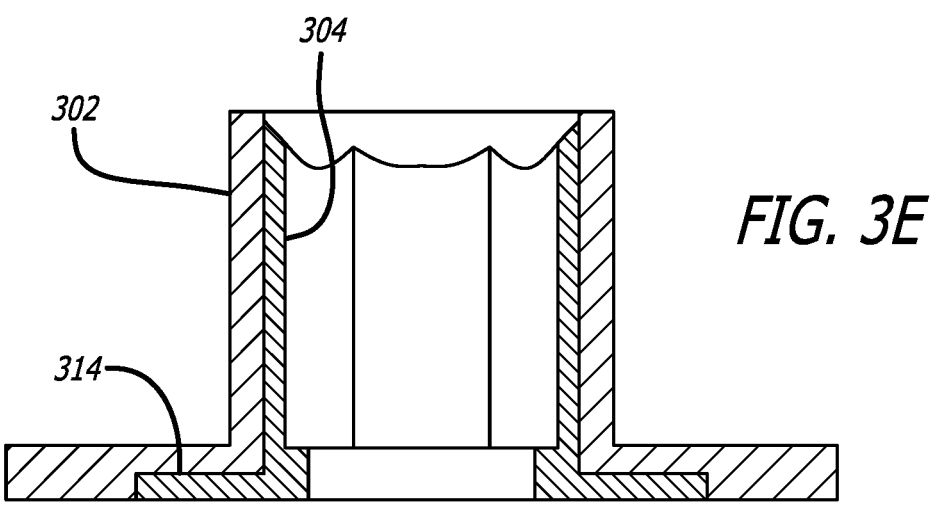
FIG. 3E is a cross sectional view of the insert of FIGS. 3A-3D, according to an example of the present disclosure.

When fastening devices are used to fasten panels, for example, to another panel or to other systems, inserts may be used to reinforce the area of the panel where the fastening device enters or passes through the panel. For example, the interior floor panels of a passenger cabin in an aircraft may be made of carbon fiber honeycomb panels, and an insert may be disposed through a hole formed in the honeycomb panel, thus reinforcing the hole through the panel while allowing for the fastening device to fit through the hole and securely hold the panel in place. A conventional insert is illustrated in FIG. 2 which may be made entirely of aluminum, which is a relatively light weight and high strength material. However, due to differing material properties of the insert (e.g., aluminum) and the panels (e.g., carbon), corrosion becomes inevitable over time. Various examples described throughout the present disclosure provides techniques to overcome the corrosion challenges.

FIG. 1 is a cross sectional perspective view of an insert disposed in an opening of a panel and an exploded perspective view of a corresponding fastener assembly configured to be disposed through an opening of the insert, according to an example of the present disclosure. As illustrated, a floor panel 102 of an aircraft interior is coupled to a seat track 104 with an example fastener assembly 106. To support the fastener assembly 106, the floor panel 102 has therein an insert 120 to reinforce the hole in the floor panel 102 and to accommodate the fastener assembly 106. The example fastener assembly 106 includes at least a fastener 108 and an e-nut 110. In use, the e-nut 110 is configured to be accommodated in the insert 120 of the floor panel 102 and the fastener 108 may be screwed in to the body 118 of the e-nut, which causes tines 116 of the e-nut 110 to expand outwardly to grip the seat track 104. Accordingly, the floor panel 102 is securely coupled to the seat track 104 below the floor panel 102. Although an e-nut is illustrated in FIG. 1 as an example fastener assembly, it is merely one example of a fastener assembly and that other types of fastening assemblies and or devices may be used instead.

FIGS. 3A-3E illustrate an insert 300 from various angles, according to an example of the present disclosure. The insert 300 is made such that the portion that comes in to contact with the panel is made of a non-corrosive material and the portion that does not contact the panel may be made of other material with less regard to corrosion characteristics.

The insert 300 includes an outer sleeve 302 and an inner sleeve 304 concentrically coupled together to form the insert 300. The outer sleeve 302 includes a first tubular portion 306 and a first disk portion 310. The first disk portion 310 may be substantially perpendicular to the first tubular portion 306. The inner sleeve 304 includes a second tubular portion 308 and a second disk portion 312, and the second disk portion 312 may be substantially perpendicular to the second tubular portion 308. The second tubular portion 308 of the inner sleeve 304 is configured to be inserted in to the first tubular portion 306 of the outer sleeve 302 such that the second tubular portion 308 snuggly fits inside the first tubular portion 306. Thus, the outer diameter of the second tubular portion 308 is about the same or slightly smaller than the inner diameter of the first tubular portion 306 so that the first tubular portion 306 is able to snuggly fit over the second tubular portion 308.

According to an example of the present disclosure, the first disk portion 310 has a first surface 320 and a second surface 322. The second surface 322 of the first disk portion 310 may include a recessed portion 314 to accommodate the second disk portion 312 of the inner sleeve 304. Thus, the depth of the recessed portion 314 is about the same thickness as the second disk portion 312 of the inner sleeve 304 (e.g., the distance between the first surface 320 and the second surface 322) such that the entire second disk portion 312 may be fitted in the recessed portion 314 and the second surface 322 of the first disk portion 310 is flush with the surface of the second disk portion 312 when the inner sleeve 304 is inserted in the outer sleeve 302. An interior 316 of the second tubular portion 308 of the inner sleeve 304 may be shaped to conform to contours (e.g., anti-rotation contours) and dimensions of the fastener assembly 106 for which it accommodates. In the example of an e-nut fastening device, the interior 316 of the second tubular portion 308 may have a hexagonal anti-rotation feature so that the fastening device will not turn when installed in the insert 300.

The outer sleeve 302 includes grips 318 configured to bite into and grip the floor panel 112 where the grips 318 contact when inserted into the floor panel 102. This prevents the inserts from rotating or spinning in the hole of the floor panel 112. The grips 318 may be a plurality of raised ridges formed all around the base of the first tubular portion 306 at the intersection of the first tubular portion 306 and the first disk portion 310. Accordingly, the insert 300 may be made of the outer sleeve 302 and the inner sleeve 304, each made of a different material with consideration given to strength, weight, and corrosion characteristics of the material. For example, because the outer sleeve 302 comes in contact with the floor panel, the outer sleeve 302 may be made of a plastic material, such as, Ultem or fiber reinforced Ultem to prevent corrosion of the outer sleeve 302 when it comes in contact with the carbon material of the floor panel. The inner sleeve 304 may be made of a lightweight metallic material such as, for example, titanium, aluminum, stainless steel, or other alloys, thus providing strength to the overall insert 300 as a whole. That is, because the outer sleeve 302 may be made of plastic material for corrosion prevention reasons, the outer sleeve 302 alone may not be sufficiently strong enough to support the fastener assembly. Therefore, the inner sleeve 304 made of a higher strength metal provides the strength needed by the insert 300 to be able to handle the fastener assembly. Because the inner sleeve 304 is completely within the outer sleeve 302, the metallic elements of the inner sleeve 304 do not come in to contact with the floor panel, thus preventing corrosion.

While the example illustrated in FIGS. 3A-3E illustrate an insert 300 configured to accommodate an e-nut, the inner sleeve 304 is interchangeable to accommodate various other types of fastening assemblies.

Figure 4:
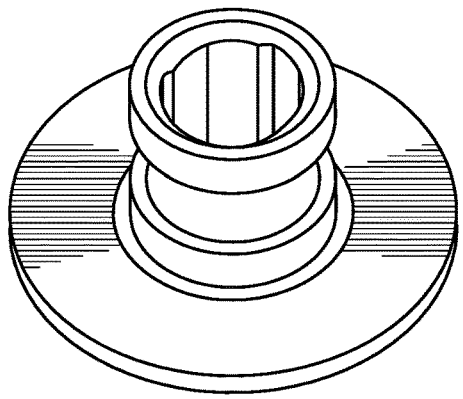
FIG. 4 is a perspective view of another conventional insert configured to be disposed in an opening of a panel.
Figure 5A:
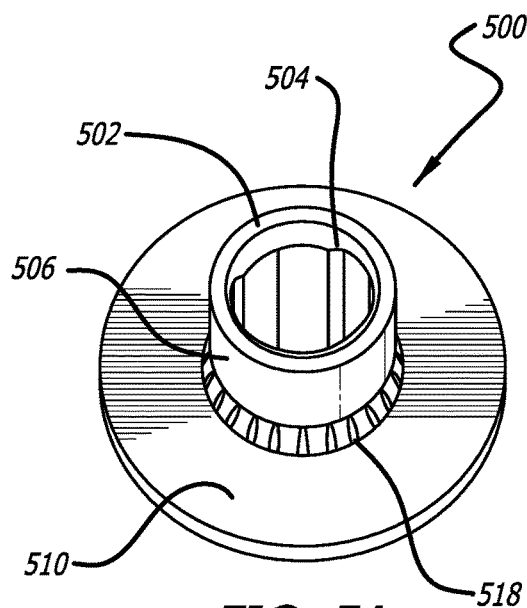
FIGS. 5A-5B are perspective views of an insert, according to another example of the present disclosure.
Figure 5B:
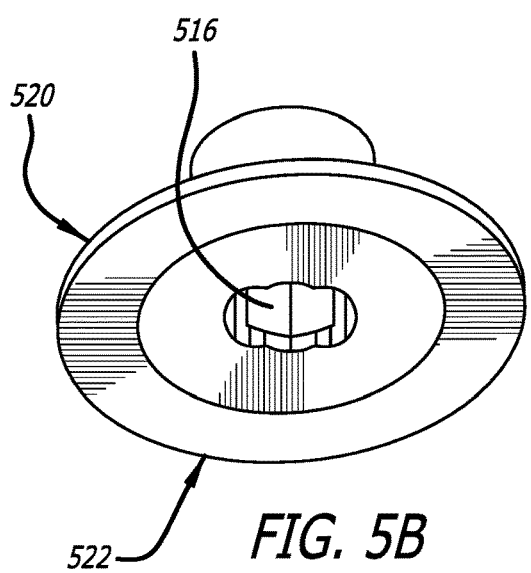
Figure 5C:
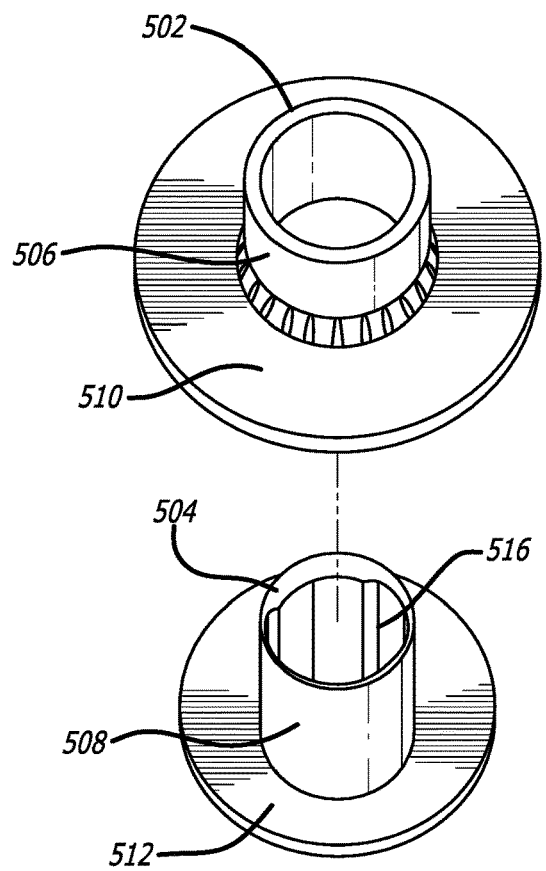
FIGS. 5C-5D are perspective exploded views of the insert of FIGS. 5A-5B, according to another example of the present disclosure.
Figure 5D:
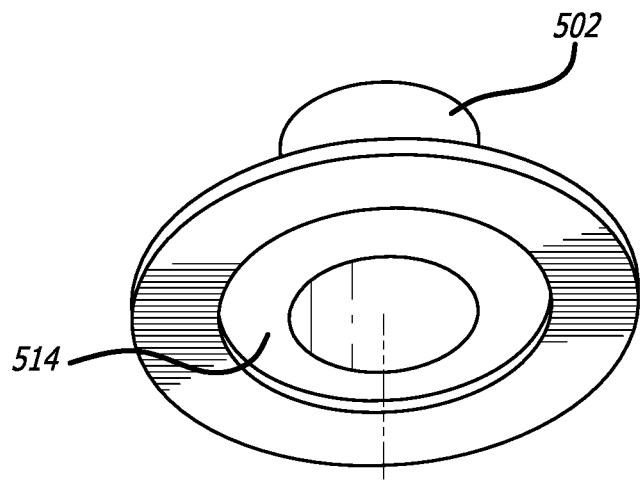
Figure 5E:
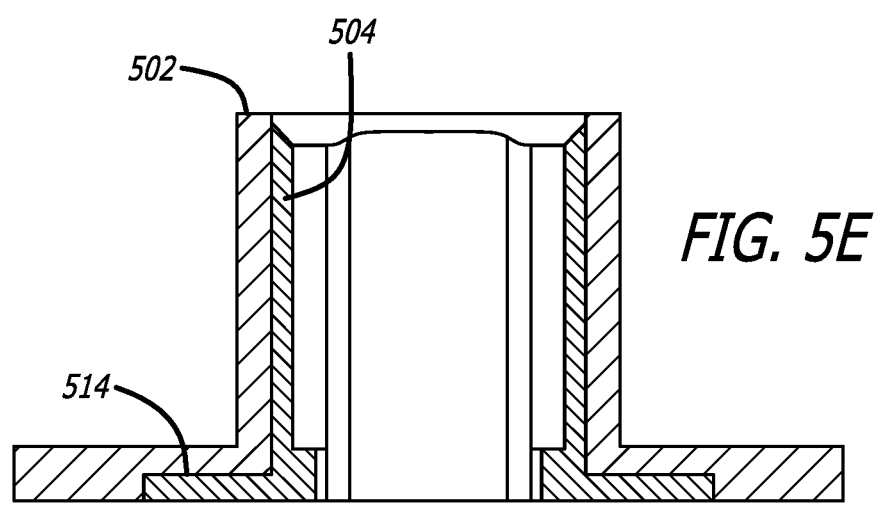
FIG. 5E is a cross sectional view of the insert of FIGS. 5A-5D, according to another example of the present disclosure.
Figure 6A:
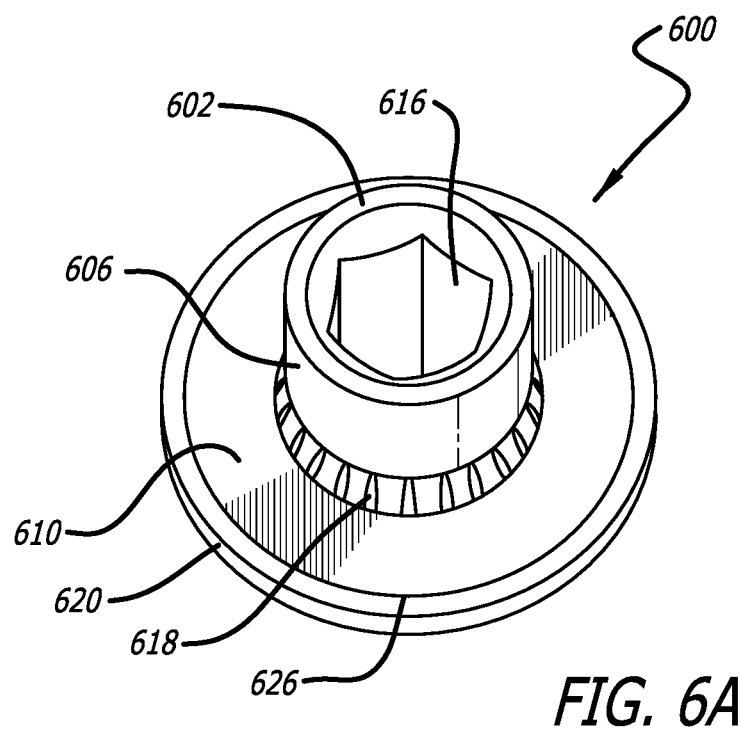
FIGS. 6A-6B are perspective views of an insert, according to yet another example of the present disclosure.
Figure 6B:
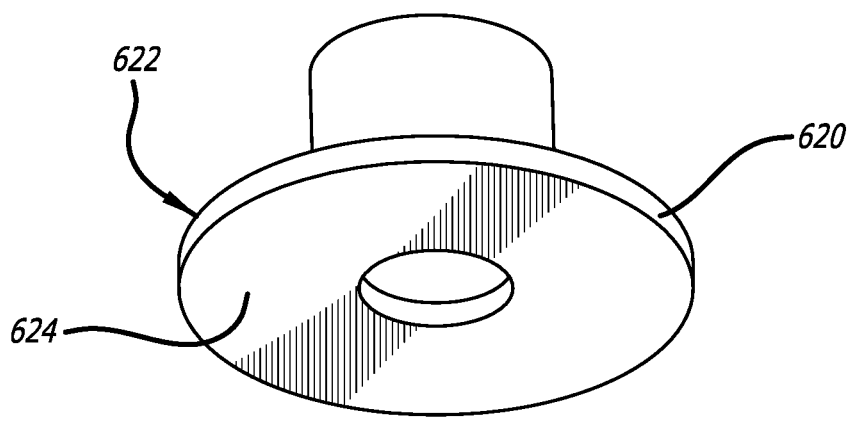
Figure 6E:
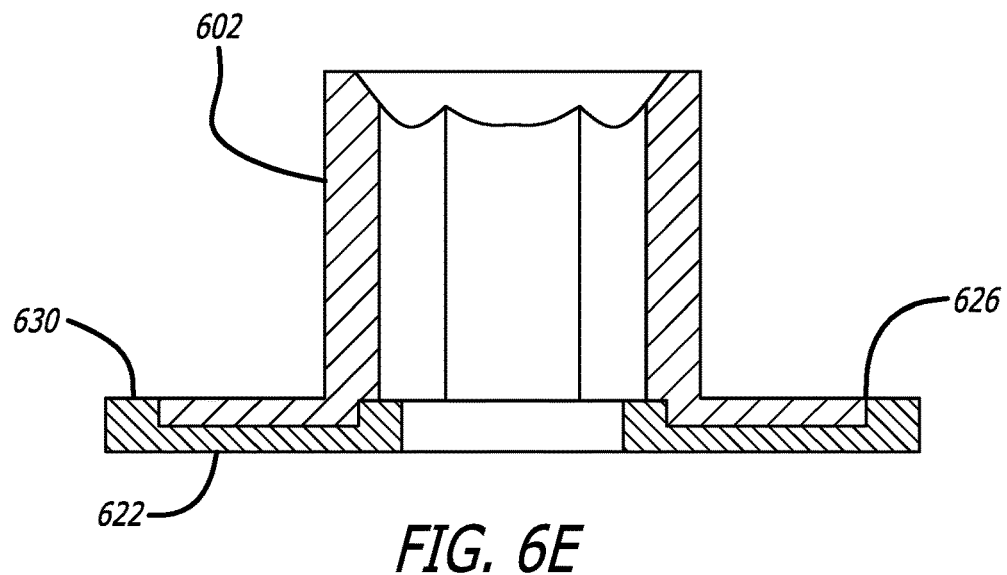
FIG. 6E is a cross sectional view of the insert of FIGS. 6A-6D, according to yet another example of the present disclosure.

FIG. 4 illustrates another conventional insert 400 configured to be used with a bi-lok fastener assembly. The insert 400 is generally monolithic and is made of a single material such as aluminum that is both strong and lightweight but is susceptible to corrosion.

FIGS. 5A-5E illustrate an insert 500 from various angles, according to another example of the present disclosure. The insert 500 is made such that the portion that comes in to contact with the panel is made of a non-corrosive material and the portion that does not contact the panel may be made of other material with less regard to corrosion characteristics.

The insert 500 includes an outer sleeve 502 and an inner sleeve 504 concentrically coupled together to form the insert 500. The outer sleeve 502 includes a first tubular portion 506 and a first disk portion 510. The first disk portion 510 may be substantially perpendicular to the first tubular portion 506. The inner sleeve 504 includes a second tubular portion 508 and a second disk portion 512, and the second disk portion 512 may be substantially perpendicular to the second tubular portion 508. The second tubular portion 508 of the inner sleeve 504 is configured to be inserted in to the first tubular portion 506 of the outer sleeve 502 such that the second tubular portion 508 snuggly fits inside the first tubular portion 506. Thus, the outer diameter of the second tubular portion 508 is about the same or slightly smaller than the inner diameter of the first tubular portion 506 so that the first tubular portion 506 is able to snuggly fit over the second tubular portion 508.

According to an example of the present disclosure, the first disk portion 510 has a first surface 520 and a second surface 522. The second surface 522 of the first disk portion 510 may include a recessed portion 514 to accommodate the second disk portion 512 of the inner sleeve 504. Thus, the depth of the recessed portion 514 is about the same thickness as the second disk portion 512 of the inner sleeve 504 (e.g., the distance between the first surface 520 and the second surface 522) such that the entire second disk portion 512 may be fitted within the recessed portion 514. Thus, the second surface 522 of the first disk portion 510 is flush with the surface of the second disk portion 512 when the inner sleeve 504 is inserted in the outer sleeve 502. An interior 516 of the second tubular portion 508 of the inner sleeve 504 may be shaped to conform to contours (e.g., anti-rotation contours) and dimensions of the fastener assembly for which it accommodates. In the example of a bi-lok fastener assembly, the interior 516 of the second tubular portion 508 may have a substantially elliptical shaped anti-rotation feature so that the fastener assembly will not turn when installed in the insert 500.

The outer sleeve 502 includes grips 518 configured to bite into and grip the floor panel 112 where the grips 518 contact when inserted into the floor panel 102. This prevents the inserts from rotating or spinning in the hole of the floor panel 112. The grips 518 may be a plurality of raised ridges formed all around the base of the first tubular portion 506 where it intersects the first disk portion 510. Accordingly, the insert 500 may be made of the outer sleeve 502 and the inner sleeve 504, each made of a different material with consideration being given to strength, weight, and corrosion characteristics of the material. For example, because the outer sleeve 502 comes in contact with the floor panel, the outer sleeve 502 may be made of a plastic material, such as, Ultem or fiber reinforced Ultem but such material. The inner sleeve 504 may be made of a lightweight metallic material such as, for example, titanium, aluminum, stainless steel, or other alloys, thus providing strength to the insert 500. Because the inner sleeve 504 is located completely within the outer sleeve 502, the metallic elements of the inner sleeve 504 do not come in to contact with the floor panel, thereby preventing corrosion.

FIGS. 6A-6E illustrate an insert 600 from various angles, according to yet another example of the present disclosure. The insert 600 includes a sleeve 602 having a substantially tubular portion 606 and a disk portion 610 perpendicular to the tubular portion 606 at an end of the tubular portion 606. The tubular portion 606 is substantially cylindrically shaped and the interior 616 of the tubular portion 606 may have an anti-rotation feature to accommodate for example, an e-nut. In the case of an e-nut, the anti-rotation feature is a hexagonal shape so as to fit a hexagonal shaped e-nut fastener. In other examples, the interior 616 of the tubular portion 606 may have a different anti-rotation shape, for example, a substantially elliptical shape to accommodate a bi-lok fastener device.

The sleeve 602 may be made of a corrosion resistant material including plastic material, such as, Ultem or fiber reinforced Ultem. Thus, the risk of corrosion from installing the insert 600 in to a floor panel is negligible because the insert 600 is made of a corrosion resistant material.

According to the example, a plate 620 is coupled to the disk portion 610 of the sleeve 602 to increase the overall strength of the insert 600. The plate 620 has a first surface 622 and a second surface 624, wherein the first surface includes a recessed portion 626 to accommodate the disk portion 610 of the sleeve 602. Accordingly, the diameter of the plate 620 is larger than the diameter of the disk portion 610, and the disk portion 610 is configured to fit within the recessed portion 626 of the plate such that the tubular portion 606 of the sleeve 602 and the plate 620 are concentrically aligned. The depth of the recessed portion 626 is about the thickness of the disk portion 610 of the sleeve 602 so that when the disk portion 610 is inserted in to the recessed portion 626, the disk portion 610 will sit flush with the first surface 622 of the plate 620. Consequently, the insert 600 is a lightweight non-corrosive insert reinforced with a high strength plate made out of, for example, metal alloys and/or titanium. A non-corrosive material should be selected for the plate 620 because the outer edges 630 of the plate 620 may come in to contact with the floor panel 112.

The sleeve 602 may include grips 618 configured to bite into and grip the floor panel 112 where the grips 618 contact when inserted into the floor panel 102. This prevents the inserts from rotating or spinning in the hole of the floor panel 112. The grips 618 may be a plurality of raised ridges formed all around the base of the tubular portion 606 where it intersects the disk portion 610.

Figure 7:
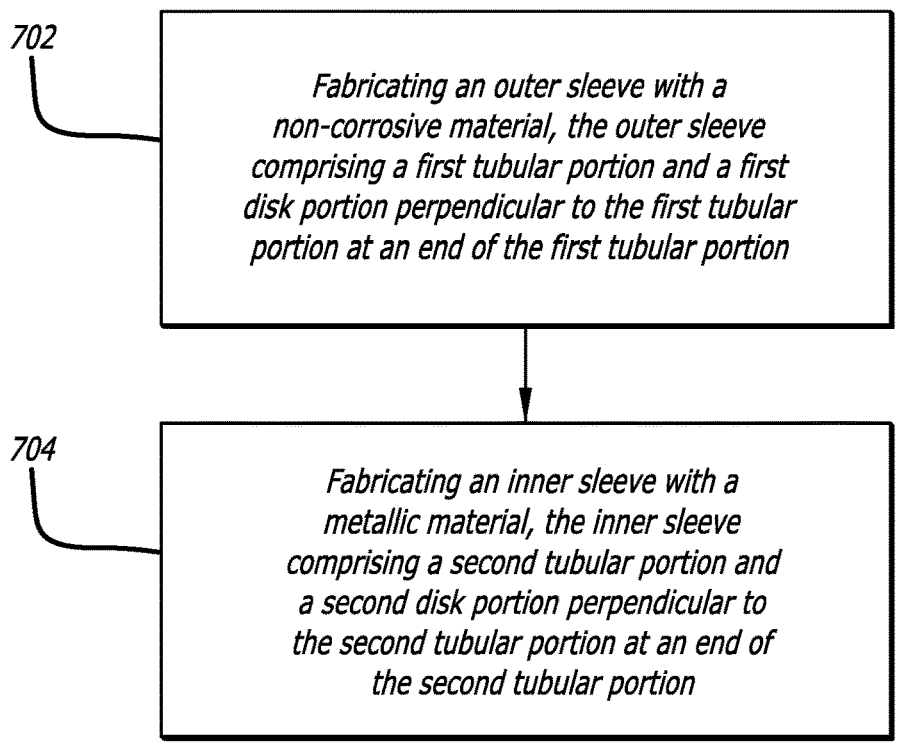
FIG. 7 is a flow chart of a method for manufacturing the insert, according to various examples of the present disclosure.

FIG. 7 is a flow chart of a method for manufacturing the inserts, according to various examples of the present disclosure. According to the example, an insert may be manufactured by fabricating the outer sleeve and the inner sleeve separately and then coupling the two sleeves together. For example, the first tubular portion 306 and the first disk portion 310 of the outer sleeve may be fabricated perpendicular to each other using a non-corrosive material (702). The outer sleeve may be fabricated using additive manufacturing techniques known to those skilled in the art or it may be fabricated in molds. The second tubular portion 308 and the second disk portion 312 may be fabricated perpendicular to each other using a high strength steel or other lightweight and non-corrosive material (704). While using a non-corrosive material for the inner sleeve is desirable because it ensures that the insert will not rust, a potentially corrosive material such as aluminum may also be used in certain examples because the inner sleeve 304 does not come in contact with the floor panel and therefore is unlikely to corrode. The inner sleeve 304 may also be fabricated using additive manufacturing techniques or may be fabricated using a mold, or other techniques known in the art. With each of the inner sleeve 304 and the outer sleeve 302 fabricated, the two sleeves may be coupled together by inserting the second tubular portion 308 of the inner sleeve 304 inside of the first tubular portion 306 of the outer sleeve 302, and the second disk portion 312 of the inner sleeve 304 may be fitted within the recessed portion 314 of the outer sleeve 302 to form a single combined insert according to various examples of the present disclosure. In some examples, the outer sleeve 302 and the inner sleeve 304 may be fabricated together using additive manufacturing techniques such as, for example, plastic over metal.

As provided throughout the present disclosure, techniques for mounting panels in an aircraft are described. Although the examples of the inserts were explained with reference to floor panels of an aircraft, the inserts may be used with other panels as well, such as, for example, bulkheads, galley walls, cargo bay walls, etc.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. An insert, comprising:
   an outer sleeve comprising a first tubular portion having a first outer diameter, a first disk portion perpendicular to the first tubular portion at an end of the first tubular portion, and anti-rotation features formed at the intersection between the first tubular portion and the first disk portion;
   an inner sleeve comprising a second tubular portion and a second disk portion perpendicular to the second tubular portion at an end of the second tubular portion, the second disk portion having a second outer diameter;
   wherein the second tubular portion comprises an inner chamfered edge at an end opposite the second disk portion;
   wherein the second outer diameter of the second disk portion is greater than the first outer diameter of the first tubular portion;
   wherein the second tubular portion of the inner sleeve is configured to be inserted in the first tubular portion of the outer sleeve; and
   wherein the first disk portion of the outer sleeve comprises a first surface and a second surface, wherein the second surface comprises a recess configured to accommodate the second disk portion of the inner sleeve when the second tubular portion is inserted in the first tubular portion.

2. The insert of claim 1, wherein the outer sleeve is made of a material different than the material of the inner sleeve.

3. The insert of claim 2, wherein the outer sleeve is made of a non-corrosive material and the inner sleeve is made of a metallic material.

4. The insert of claim 3, wherein the non-corrosive material is fabricated on the metallic material using an additive manufacturing process.

5. The insert of claim 1, wherein the insert is configured to be accommodated in an opening of a panel to couple the panel to a mount, wherein the inner sleeve does not directly contact the panel, and wherein the anti-rotation features comprise a plurality of raised ridges configured to bite into and grip the panel.

6. The insert of claim 5, wherein the panel is a floor panel of an aircraft and the mount is a seat track of an aircraft, and wherein the second tubular portion of the inner sleeve is configured to accommodate a fastener assembly, such that the floor panel is coupled to the seat track when a fastener is inserted through the fastener assembly and the seat track.

7. The insert of claim 1,
   wherein the inner sleeve and the outer sleeve are concentrically aligned when the inner sleeve is inserted in the outer sleeve, and
   wherein the second tubular portion of the inner sleeve comprises an anti-rotation contour to limit rotation of a fastener assembly relative to the second tubular portion.

8. The insert of claim 1, wherein the second surface is flush with a bottom surface of the second disk portion when the second tubular portion is inserted in the first tubular portion.

9. An aircraft, comprising:
   a seat track;
   a floor panel mounted on the seat track;
   the insert of claim 1 disposed in an opening of the floor panel, the anti-rotation features gripping the floor panel to limit the insert from rotating or spinning in the opening of the floor panel; and
   a fastener assembly inserted in the second tubular portion of the inner sleeve of the insert to couple the floor panel to the seat track.

10. An insert, comprising:
    a sleeve comprising a substantially tubular portion having a first outer diameter, a disk portion perpendicular to the tubular portion at an end of the tubular portion, and anti-rotation features formed at the intersection between the tubular portion and the disk portion; and
    a plate configured to be inserted at least partly in the sleeve, the plate comprising a second outer diameter larger than the disk portion of the sleeve and larger than the first outer diameter of the tubular portion, and comprising a first surface and a second surface, wherein the first surface comprises a recessed portion configured to accommodate the disk portion of the sleeve.

11. The insert of claim 10, wherein the sleeve is made of a material different than the material of the plate.

12. The insert of claim 11, wherein the sleeve is made of a non-corrosive material and the plate is made of a metallic material.

13. The insert of claim 10, wherein the disk portion of the sleeve is accommodated in the recessed portion of the first surface, and the sleeve is concentrically aligned with the plate.

14. The insert of claim 13, wherein a depth of the recessed portion of the first surface is about a thickness of the disk portion of the sleeve.

15. The insert of claim 10, wherein the insert is configured to be accommodated in an opening of a floor panel to couple the floor panel to a seat track of an aircraft, and wherein the anti-rotation features comprise a plurality of raised ridges configured to bite into and grip the floor panel.

16. The insert of claim 15, wherein the tubular portion of the sleeve is configured to accommodate a fastener assembly, such that the floor panel is coupled to the seat track when a fastener is inserted through the fastener assembly and the seat track.

17. The insert of claim 10, wherein the tubular portion comprises an anti-rotation contour to limit rotation of a fastener assembly relative to the tubular portion.

18. An aircraft, comprising:
a seat track;
a floor panel mounted on the seat track;
the insert of claim 10 disposed in an opening of the floor panel, the anti-rotation features gripping the floor panel to limit the insert from rotating or spinning in the opening of the floor panel; and
a fastener assembly inserted in the tubular portion of the sleeve to couple the floor panel to the seat track.

19. A method for manufacturing an insert, comprising:
fabricating an outer sleeve with a non-corrosive material, the outer sleeve comprising a first tubular portion having a first outer diameter, a first disk portion perpendicular to the first tubular portion at an end of the first tubular portion, and anti-rotation features formed at the intersection between the first tubular portion and the first disk portion;
fabricating an inner sleeve with a metallic material, the inner sleeve comprising a second tubular portion and a second disk portion perpendicular to the second tubular portion at an end of the second tubular portion, the second disk portion having a second outer diameter;
wherein the second tubular portion comprises an inner chamfered edge at an end opposite the second disk portion;
wherein the second outer diameter of the second disk portion is greater than the first outer diameter of the first tubular portion;
wherein the second tubular portion of the inner sleeve is configured to be inserted in the first tubular portion of the outer sleeve; and
wherein the first disk portion of the outer sleeve comprises a first surface and a second surface, wherein the second surface comprises a recess configured to accommodate the second disk portion of the inner sleeve when the second tubular portion is inserted in the first tubular portion.

20. The method of claim 19, wherein the fabricating the outer sleeve and the inner sleeve comprises using an additive manufacturing process, wherein the non-corrosive material is fabricated on the metallic material.

\* \* \* \* \*